US012161211B2

(12) United States Patent
Cochran

(10) Patent No.: US 12,161,211 B2
(45) Date of Patent: Dec. 10, 2024

(54) SOLUABLE 3D PRINTED CUSTOM ARTIFICIAL NAILS DESIGNED THROUGH A MOBILE APPLICATION

(71) Applicant: Brianna Storm Cochran, Atlanta, GA (US)

(72) Inventor: Brianna Storm Cochran, Atlanta, GA (US)

(*) Notice: Subject to any disclaimer, the term of this patent is extended or adjusted under 35 U.S.C. 154(b) by 644 days.

(21) Appl. No.: 17/459,669

(22) Filed: Aug. 27, 2021

(65) Prior Publication Data
US 2022/0047058 A1 Feb. 17, 2022

Related U.S. Application Data

(63) Continuation-in-part of application No. PCT/US2020/019789, filed on Feb. 26, 2020.
(Continued)

(51) Int. Cl.
*A45D 31/00* (2006.01)
*A45D 44/00* (2006.01)
(Continued)

(52) U.S. Cl.
CPC ............ *A45D 31/00* (2013.01); *A45D 44/005* (2013.01); *B29C 64/386* (2017.08); *B33Y 30/00* (2014.12); *B33Y 50/00* (2014.12); *G06F 3/04845* (2013.01); *G06Q 30/0621* (2013.01); *B29K 2101/12* (2013.01); *B29L 2031/718* (2013.01); *B33Y 80/00* (2014.12)

(58) Field of Classification Search
CPC ...... A45D 31/00; A45D 44/005; B33Y 30/00; B33Y 50/00; B33Y 80/00; G06F 3/04845; G06Q 30/0621

USPC .......................................................... 700/97
See application file for complete search history.

(56) References Cited

U.S. PATENT DOCUMENTS 7,123,983 B2 * 10/2006 Yogo ..................... A45D 31/00
700/161
7,622,511 B1 11/2009 Sirdesai et al.
(Continued)

FOREIGN PATENT DOCUMENTS

CA 3068086 A1 * 12/2018 ............. A45D 31/00
CN 101053467 A * 10/2007
(Continued)

OTHER PUBLICATIONS

United States Patent & Trademark Office, International Preliminary Report on Patentability (IPRP) issued in corresponding International application No. PCT/US2020/019789, dated Sep. 10, 2021, 13 pp.
(Continued)

*Primary Examiner* — Ronald D Hartman, Jr.
(74) *Attorney, Agent, or Firm* — Taft Stettinius & Hollister LLP

(57) ABSTRACT

The current disclosure pertains to the nail service/care industry and includes providing a unique method of offering a nail care service and artificial nail product, to increase nail health for users and environmental safety for employees, as well as offering a custom fit press on nail. The disclosure provides an artificial nail manicure set personalized by the user through a mobile application and 3D printed to each user's natural nail custom specifications with a soluble material.

17 Claims, 8 Drawing Sheets

Related U.S. Application Data

(60) Provisional application No. 62/812,186, filed on Feb. 28, 2019.

(51) Int. Cl.
*B29C 64/386* (2017.01)
*B33Y 30/00* (2015.01)
*B33Y 50/00* (2015.01)
*G06F 3/04845* (2022.01)
*G06Q 30/0601* (2023.01)
*B29K 101/12* (2006.01)
*B29L 31/00* (2006.01)
*B33Y 80/00* (2015.01)

(56) References Cited

U.S. PATENT DOCUMENTS

| | | | |
|---|---|---|---|
| 7,875,212 | B2 | 9/2011 | Hanatani et al. |
| 9,227,359 | B2 * | 1/2016 | Li .................... B29C 51/46 |
| 2006/0016455 | A1 | 1/2006 | Ide |
| 2007/0057403 | A1 * | 3/2007 | Nielson .................. A45D 31/00 264/222 |
| 2011/0087351 | A1 * | 4/2011 | Sachdeva ............... A45D 31/00 700/118 |
| 2011/0212140 | A1 | 9/2011 | Hanatani et al. |
| 2014/0159279 | A1 | 6/2014 | Coppola et al. |
| 2014/0183769 | A1 * | 7/2014 | Li ........................ B29C 51/46 264/40.1 |
| 2016/0095411 | A1 | 4/2016 | Smith |
| 2016/0302550 | A1 | 10/2016 | Teichner |
| 2016/0309877 | A1 | 10/2016 | Papshev et al. |
| 2020/0105007 | A1 | 4/2020 | Song et al. |

FOREIGN PATENT DOCUMENTS

| | | | | |
|---|---|---|---|---|
| EP | 3868249 A1 * | 8/2021 | ............. | A45D 31/00 |
| FR | 3049832 A1 * | 10/2017 | ............. | A45D 31/00 |
| JP | 2012232040 A * | 11/2012 | | |
| KR | 10-2011-0101106 A | 9/2011 | | |
| KR | 20160049195 A * | 5/2016 | | |
| KR | 101844347 B1 * | 5/2018 | | |
| RU | 2534049 C1 * | 11/2014 | ............. | A45D 31/00 |
| WO | WO-2015126533 A1 * | 8/2015 | ............. | A45D 31/00 |
| WO | WO-2015132734 A1 * | 9/2015 | ............. | A45D 31/00 |
| WO | WO-2017174703 A2 * | 10/2017 | ............. | A45D 31/00 |
| WO | WO-2018232510 A1 * | 12/2018 | | |

OTHER PUBLICATIONS

United States Patent & Trademark Office, The International Search Report and The Written Opinion issued in corresponding International application No. PCT/US2020/019789, dated Jul. 16, 2020, 17 pp.

* cited by examiner

SOLUABLE 3D PRINTED CUSTOM ARTIFICIAL NAILS DESIGNED THROUGH A MOBILE APPLICATION

CROSS-REFERENCE TO RELATED APPLICATION

This application is a Continuation-In-Part of PCT/US20/19789, filed Feb. 26, 2020, which claims priority to Provisional Patent Application Ser. No. 62/812,186 having the title "Soluble 3D Printed Custom Artificial Nails Designed Through A Mobile Application," filed Feb. 28, 2019, the disclosure of each of which are incorporated herein by reference in their entirety.

FIELD OF THE DISCLOSURE

The disclosure pertains to the nail service/care industry and includes providing a unique method of offering a nail care service and artificial nail product, to increase nail health for users and environmental safety for employees, as well as offering a custom fit press on nail. The disclosure provides an artificial nail manicure set personalized by the user through a mobile application and 3D printed to each user's natural nail using custom specifications and a soluble material.

BACKGROUND

Artificial nails, also known as fake nails, false nails, fashion nails, nail enhancements, nail wraps, or nail extensions, are extensions placed over fingernails or toenails as fashion accessories. Putting them on and taking them off can involve abrasion of the natural nail and strong adhesives such as cyanoacrylate and harsh acids and other chemicals that can cause allergic reactions and weaken users' real/natural nails. Small breaks in artificial nails or poor fitting to the natural nail bed can allow water retention between the artificial nail and the natural nail and create an ideal environment for fungal infections. Other damage (breaking, cracking, or otherwise structurally compromising the artificial nail) can compromise the natural nail.

A nail salon or nail bar is a specialty beauty salon establishment that primarily offers nail care services such as manicures, pedicures, and nail enhancements. Employees that work at these establishments are potentially exposed to dozens of chemicals including acrylates, liquids, solvents, and biocides as dusts, aerosols, or vapors, both when applying artificial nails and when removing them. A small but growing number of studies have examined links between nail technicians' work and health outcomes, such as respiratory, neurological, and musculoskeletal effects, as well as other health conditions.

Limitations of Current Artificial Nails:

The main types of currently available artificial nails are: 1) Acrylic/SNS Nails/Gel Nails; and 2) "Press-On" Nails. The disadvantages of each are discussed in greater detail below.

Disadvantages of Acrylic/SNS Nails/Gel Nails

"SNS" stands for Signature Nail Systems™ which is a powder-dipping system, accompanied by a brush-on, gel-based polish. Essentially, the nail technician applies the polish to your nail, dips it in the powder and repeats the process. SNS comes in an array of colors and shades and consists of benzoyl peroxide, titanium dioxide and acrylic ester polymer. These ingredients are touted to work to help strengthen nails rather than wear them down.

Acrylic nails are a type of artificial nail enhancement created from a mixture of both liquid and powder acrylates. They do not require photocuring. Gels are a type of acrylic-based nail polish. They are composed of a mixture of acrylate monomers that require ultraviolet (UV) light for polymerization and hardening. Gel manicure systems are a variant of acrylic nail gel and contain the traditional nail lacquer plus a base coat. The base contains photo-initiators and UV-curable acrylate oligomers instead of solvent/resin bases. During the curing process solvents evaporate and small channels form in the layer of nail polish. These channels are connected by acetone-dissolvable polymers.

The application process of gel-based manicures includes serial applications to the nail plate with a base primer, followed by a color coat and a topcoat. The nails must then be cured by UVA rays or photocuring after each coat. Nail salons predominantly use fluorescent UV lamps. Removal of gel manicures requires soaking the nail plate with 100% acetone for 10 to 15 minutes, followed by manual debridement of remaining polish if necessary.

There are several other side effects of gel manicures. Although touted as easy to remove, gel polish is often firmly adhered. The removal process may be associated with generalized nail thinning, weakness, and brittleness. In addition, pseudo-leukonychia, and onychoschizia are often associated with continual artificial nail removal. Leukonychia is a white discoloration of the underlying nailbed. In true leukonychia, the white discoloration is caused by pathology that lies in the nail matrix itself. In apparent leukonychia, there is underlying pathology is in the subungual tissue underneath the nail. Pseudo-leukonychia results from an exogenous source such as fungal infection, keratin granulation from nail polish, and psoriasis. Onychoschizia, commonly known as nail splitting but also known as onychoschisis or lamellar dystrophy, is a condition that causes horizontal splits within the nail plate. Nail splitting is often seen together with onychorrhexis—long-wise (longitudinal) splitting or ridging of the nail plate—and these 2 diseases together are called "brittle nail syndrome." Frequent wetting and drying of the hands is the most common cause of nail splitting, so this condition is, therefore, common among house cleaners, nurses, and hairdressers. Nail splitting may also be caused by nail cosmetics (hardeners, polish, and polish removers/solvents), nail procedures, and occupational exposure to various chemicals (alkalis, acids, cement, solvents, thioglycolates, salt, sugar solutions). Injury and other medical problems may also play a role in the development of brittle nails.

Acrylic chemicals have been known to penetrate the nail plate and irritate the nail bed. This irritation can occur in patients who are sensitive to chemicals or have thin nails. Known risks of traditional manicures include procedure-related infections (bacterial, fungal, mycobacterial, and viral, including human papilloma virus and herpes simplex virus). Inadequately sterilized instruments, such as clippers, blades, abrasive files, and electric drills, may harbor and abet the growth of micro-organisms. Micro and macro-traumas may be induced through the cleaning, filing, and trimming of cuticles, thus allowing the infiltration of micro-organisms. Materials, such as nail polish and nail enhancers, contain certain chemicals that can serve as contact sensitizers when accidentally applied to periungual skin. Chemicals, including acrylates, formaldehyde, and toluene sulphonamide-formaldehyde resin, may lead to contact dermatitis and chronic paronychia. Primers and polish removers, which are largely solvents, can dry nails and contribute to brittleness.

The following are some of the clinical examples that are less frequently reported, but not uncommon disorders related to nail cosmetics.

Traumatic onycholysis is often associated with chronic paronychia. Such infections occur as manicure removal of the cuticle breaks an essential barrier to micro-organism infiltration of the nail. In patients wearing acrylic nails, traumatic onycholysis is very common. These patients usually wear very long nails, and adhesion of the acrylic nail to the nail plate is stronger than adhesion of the nail plate to the nail bed.

Keratin degranulation may also occur. The process of nail polish binding to and subsequently being removed from the nail plate may result in keratin degranulation. The clinical features of this finding are white striations, macules, and patches on the nail plate.

Contact dermatitis is also commonly seen. Although the risk of allergic contact dermatitis to nail cosmetics is well-established, there have been an increased number of cases of acrylate monomer-associated contact dermatitis with the increased utilization of photo-bonded acrylic gel nails. Cases typically include periungual eczematous dermatitis, but there exist reports of eczematous lesions in more proximal locations of the hand and face, purportedly via airborne transit of nail dust.

Peripheral neuropathy, a rare complication of acrylic cosmetic nails, has been reported in a few cases of patients with positive patch testing to methacrylates. Although the mechanism of toxicity is unknown, it may be associated with local neuropathy induced by methylmethacrylate.

Worn down or over-filed nails represent the direct result of patient or nail salon operator-induced mechanical trauma. This phenomenon is typically seen in patients wearing acrylic nails, as complete removal of the nails often requires mechanical abrasion. Nails are filed tangentially to eliminate resin residues, reduce superficial irregularities, and improve texture and appearance.

Clinically the nails show distal thinning with a triangular or half-moon morphology extending distally from the mid-plate, and forming a mirror image to the lunula Pseudo-psoriatic nails describe a clinical pattern that has been reported in patients wearing acrylic nails. Clinical features, including onycholysis and severe subungual hyperkeratosis, are often quite similar to those of psoriatic nails. In fact, cases have been misdiagnosed and mistreated with topical and intralesional corticosteroids or even immunosuppressants if there is coincident joint pain. Although this clinical pattern theoretically may be triggered by traumatic removal of firmly attached acrylic nails via Koebnerization, the authors have seen patients with pseudo-psoriatic nails that developed before the removal of acrylic nails. These patients have had positive patch testing to methylmethacrylate, suggesting that acrylate sensitization can cause this clinical phenotype.

Disadvantages of Press-on Nails

Press-on nails are simply artificial nails that are applied or pressed on to the nail and affixed with glue. While their popularity has fluctuated over the years, they still remain a popular means of a quick manicure. Press-on nails do not require any specialized application procedures and are widely available to consumers. However, there are many disadvantages and problems associated with repeated use of press-on nails.

Glue toxicity can occur when the cuticles and surrounding tissues are allergic to the ethyl cyanoacrylate glue. About 5% of the population can become sensitized to cyanoacrylate fumes after repeated exposure, resulting in flu-like symptoms. Traditional nail glue is harmful by inhalation, and irritating to the eyes, respiratory system, and skin.

A long application time is often a major difficulty because of variability in the user's nail plate shape. Typically, a user receives up to 24 nails in normal commercially available pack of press-on nails. The user must estimate which nail to place over their natural nail plate. If the artificial nails have a different curve than the natural nail plate, then it forces the nail plate to shape into a deeper curve causing discomfort. Usually this process of fitting and subsequently gluing is time-consuming. It is prone to user-error as well, such as poor-fit, too much or too little glue, etc.

Removal issues are also quite common with press-on nails. For example, if the user desires immediate removal, then they must forcibly remove the artificial nail by prying the product. This action can cause damage to the natural nail plate. The user alternatively can wait for the product to naturally release itself, but not all artificial nails will release at the same time, causing an unsightly look.

Glue residue is often an after effect of press-on nails. After the artificial nails are removed, a white crust from the glue is usually left all over the user's natural nail plate. In order to remove this glue, the user must apply acetone and rub over the natural nail plate.

What is needed is an artificial nail alternative that does not put the user's nail health at risk but gives a pleasing aesthetic look that the user can personalize to their liking and have control over the removal process—without harsh chemicals involved.

SUMMARY OF THE INVENTION

According to one aspect of the present disclosure, a method for making soluble 3D custom artificial nails for a user may include a measuring tool, an artificial nail set, and a mobile application. The mobile application may reside on the mobile device of the user. This method may provide an interactive experience for the user, allowing the user to choose and purchase the artificial nail set. The artificial nail set may be constructed for the user from measurements made using the measuring tool. In one embodiment, a color pigment may be mixed into 3D printing material.

In some embodiments, the nail coating can be optionally applied, at the discretion of the user, to each nail of the artificial set. This method may comprise an adhesive, which may be a rapid-curing adhesive. The rapid-curing adhesive may be a cyanoacrylate, and this cyanoacrylate may be a medical grade biocompatible cyanoacrylate. This adhesive may be non-toxic. The adhesive may be a water-soluble hydrogel adhesive. The adhesive may also be selected from a natural polymer or a synthetic polymer, such as dextrin or starch. The adhesive may also be a synthetic polymer. This synthetic polymer may be selected from the group comprising polyvinyl alcohol, cellulose ethers, methylcellulose, carboxymethylcellulose, and polyvinylpyrrolidone.

In some embodiments, the nail set may comprise a soluble polymer selected from the group comprising polyvinyl alcohol, butenediol vinyl alcohol co-polymer, and polyvinyl alcohol composites. The nails of the artificial nail set may also be formed from a soluble thermoplastic followed by ultraviolet curing.

In some embodiments, the nail coating may be a hard coating selected from the group comprising a gel polish or gel coating. This gel coating may be UV-cured, catalyst cured, or temperature cured. The nail coating may be a colored specialty rubber based insulating coating. This colored specialty rubber based insulating coating may be a synthetic rubber or any artificial elastomer. The nail coating may further contain raw color pigments. In some embodiments, the artificial nails may be made of non-soluble material comprising metal, wood, or gemstones.

In another embodiment, the measuring tool comprises of the following steps. First, the user places a camera In front of a single designated nail; then the user selects a desired shape classification overlay which closely matches the user's natural nail. Then, the user scales the shape classification overlay to match the natural nail. The user repeats these steps for all remaining nails. The measurements taken are stored either locally or in a centralized database.

These and other features of the present disclosure will become more apparent from the following description of the illustrative embodiments.

BRIEF DESCRIPTION OF DRAWINGS

FIG. 4 shows the natural nail bed; adhesive coating; reinforced nail tip; protective insoluble top coat; and the artificial nail soluble base.

Figure 1:
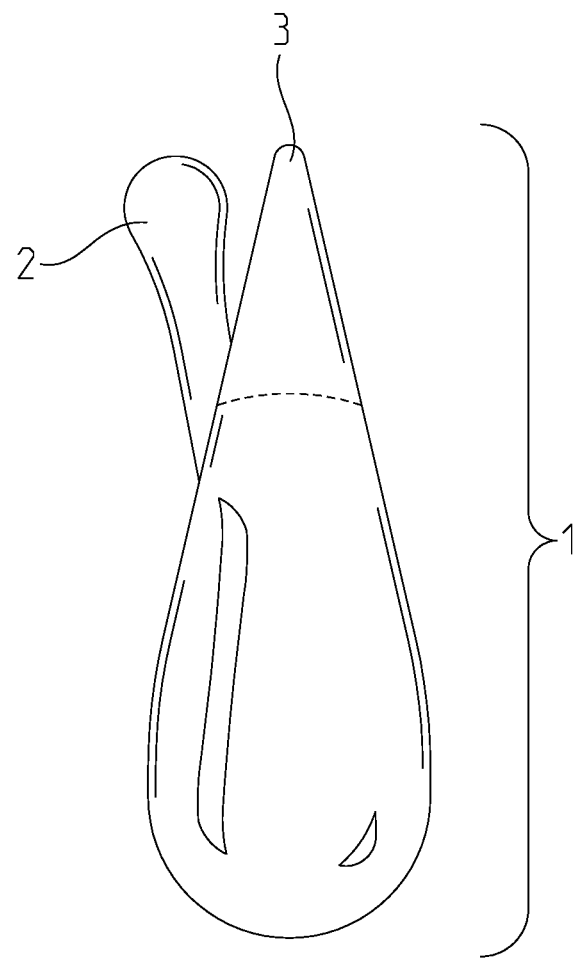
FIG. 1 depicts a typical artificial nail of the disclosure. Each artificial nail will be covered with a protective insoluble top coating; the artificial nail may have an adhesive release liner tab protecting the adhesive to be removed before application; the artificial nail may have a reinforced nail tip.
Figure 2:
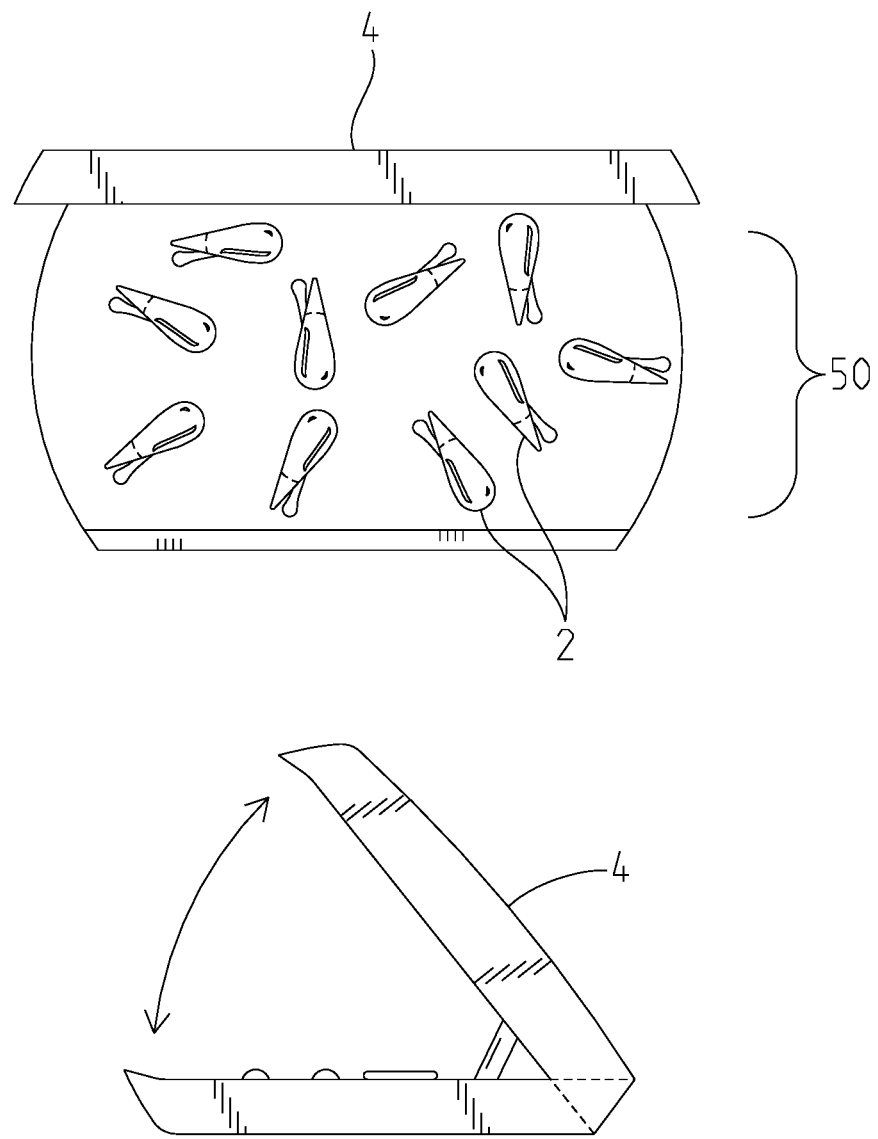
FIG. 2 is an example of a set of artificial nails contained within a recyclable/reusable box or other form of packaging; coated with the adhesive release liner tab which is removed just before application.
Figure 3:
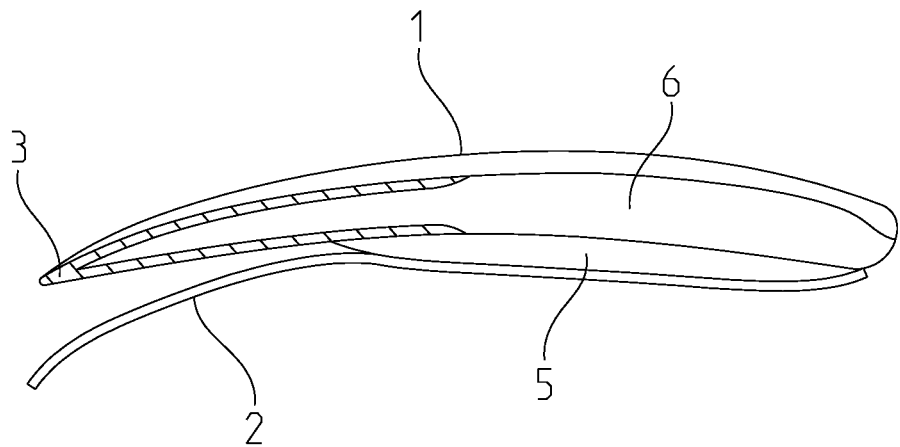
FIG. 3 is a sagittal cross-section of the artificial nail including the adhesive release liner tab. Each nail has: an adhesive coating; adhesive release liner tab; reinforced nail tip; protective insoluble top coating; and artificial nail soluble base.
Figure 4:
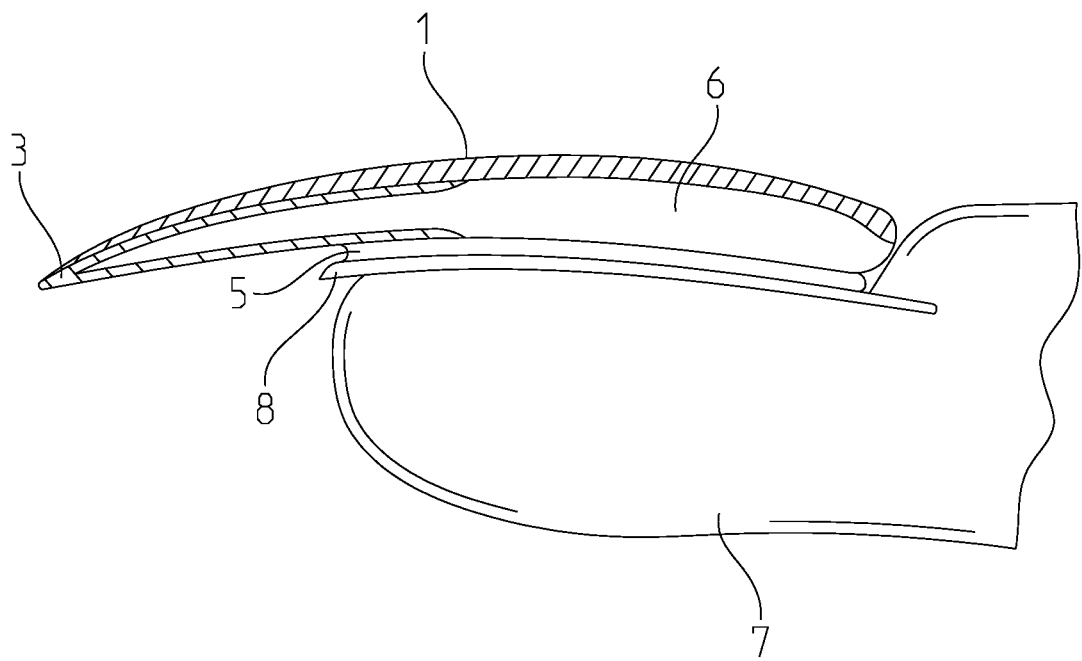
FIG. 4 is a sagittal cross-section of an artificial nail adhered to a user's finger.

Corresponding reference characters indicate corresponding parts throughout the several views. Although the exemplification set out herein illustrates embodiments of the present application, in several forms, the embodiments disclosed below are not intended to be exhaustive or to be construed as limiting the scope of the present application to the precise forms disclosed.

Figures 8, 9, 10, 11:
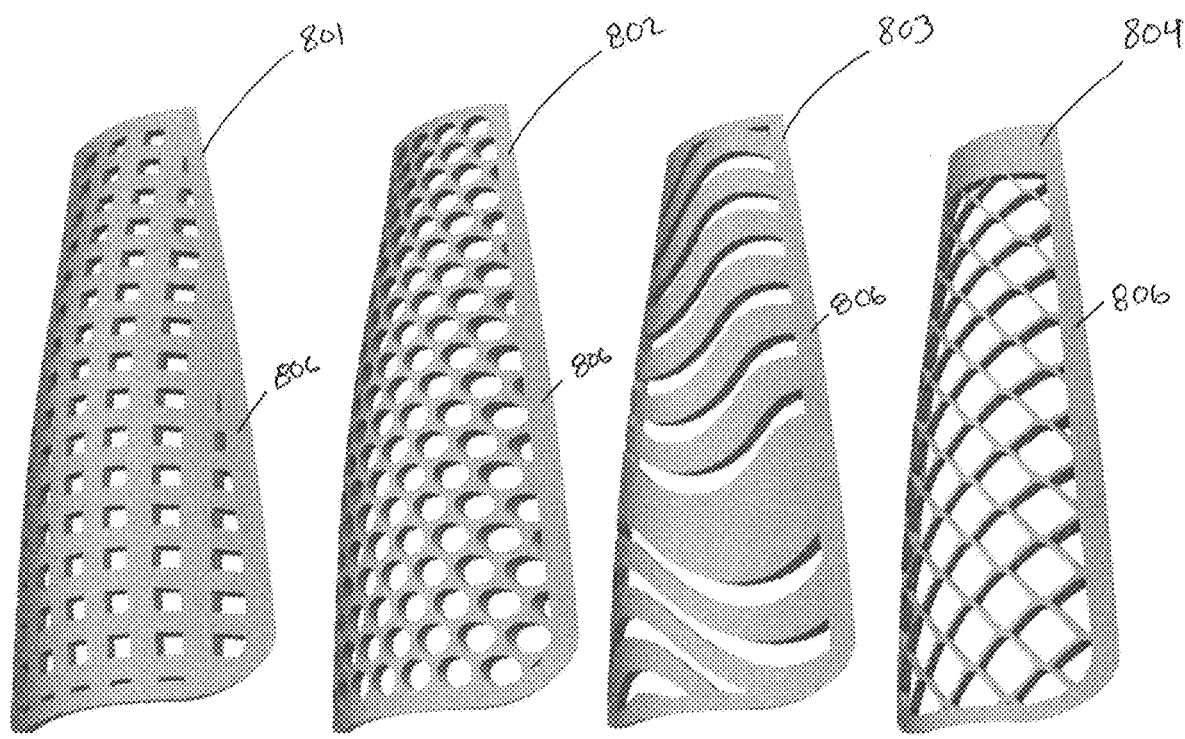

FIG. 8 is an artificial nail having a first three-dimensional pattern.

FIG. 9 is an artificial nail having a second three-dimensional pattern.

FIG. 10 is an artificial nail having a third three-dimensional pattern.

FIG. 11 is an artificial nail having a fourth three-dimensional pattern.

Figures 12, 13:
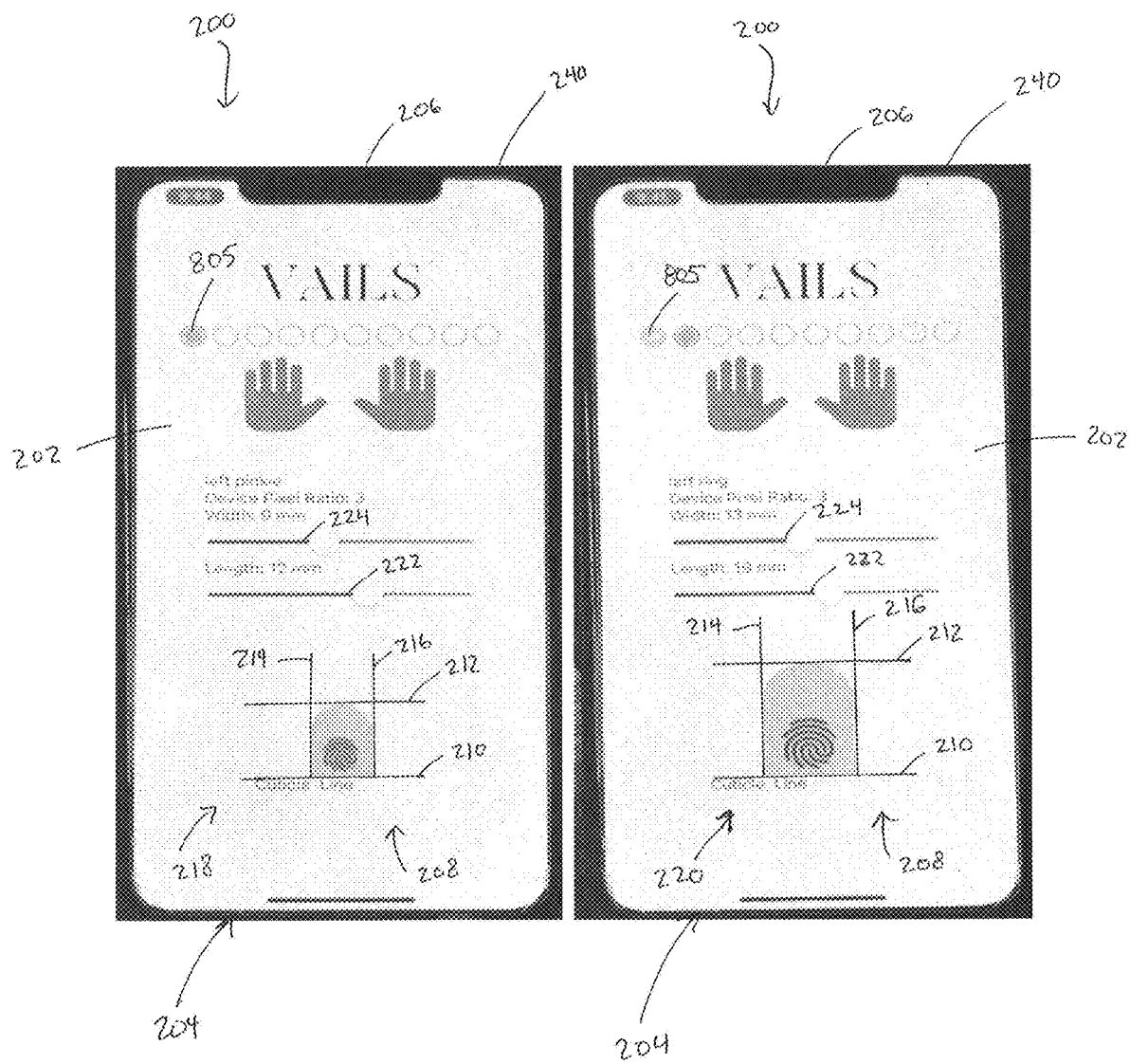

FIG. 12 is a mobile device comprising a portion of a cosmetic nail system including an image capturing device, a user interface, and a dimensioning device, wherein the user interface is shown displaying a nail receiving portion with a first set of dimensions.

FIG. 13 is the mobile device comprising a portion of the cosmetic nail system including an image capturing device, a user interface, and a dimensioning device, wherein the user interface is displaying a nail receiving portion with a second set of dimensions.

DETAILED DESCRIPTION

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains.

The disclosure is directed to a 3D-printed, soluble, biocompatible, custom-fit artificial nail designed through a Mobile Application 21. The nail products of the disclosure have several advantages of what is currently known in the art: 1) the nail is custom fit to the shape, curvature, width, and length of the user's natural nail bed 8; 2) the nail readily dissolves in water rather than acetone; 3) the nail is fully personalized by nail tip shape, the length, the color, the design or image overlay, texture and finish through the Mobile Application 21 to create a unique user design 47; 4) the nail is non-toxic; and 5) the nail has minimal to no harm upon ecosystems or the environment.

In addition, the current disclosure provides solutions to many problems with current nail technologies including but not limited to: 1) a custom shape, size, and curvature allows the artificial nail to fit better to the natural nail, meaning a stronger (and subsequently more toxic) glue is not necessary to keep the nails adhered; 2) the material the nail is made from is compatible with more non-toxic glues and coating/films/wraps that will be safer for nail adherence; 3) the dissolution in water allows for the user to remove nails at any time they wish and without the use of acetone (which strips and dries out the nail); 4) there is no forceful removal (filing, pulling, etc.) which means the layers that make up the natural nail stay intact; 5) the non-toxic materials used do not pose a health-risk for inhalation, skin contact, or nail absorbance; 6) the materials used to make the nails of the current disclosure fully dissolves in water and reduce microplastics pollution; 7) there is no excess nail material; and 8) the nails and adhesive can be drug-loaded to improve user nail health rather than degrade it.

The Soluble 3D Printed Custom Artificial Nails:

The methods described herein consist of a system of five components: i) the Measuring Tool 9 to measure the dimensions and shape of the nail for storage and subsequent creation of an Artificial Nail Set 50; ii) the Mobile Application 21 which is a mobile interface residing on the user's mobile device that includes the Measuring Tool 9 and an interactive experience allowing the user to choose and purchase the Artificial Nail Set 50; iii) the Artificial Nail Set 50 constructed for the user from the measurements made via the Measuring Tool 9; iv) an easily removable protective insoluble top coating 1; and v) a non-toxic nail adhesive coating 5. The advantages of the disclosure includes the biocompatibility with the nail plate and natural keratinization process, the easy removal process, the ability to modify the materials to heal fungal infections and other nail damage(s), as well as the full customizability of the design, curvature, shape, and size of the press on nail. Augmented reality gives users the ability to personalize their manicures and pedicures with their own unique user design 47. The nails are easily removed because they are formed from a soluble polymer such as polyvinyl alcohol, butenediol vinyl alcohol co-polymer, polyvinyl alcohol composites, and such which prevents damage to the nail bed 8 regularly caused by conventional products. Using the disclosure, there is the further advantage to reduce the use of harmful chemicals in salon environments, capitalize on drug loading abilities of materials, and maintain nail bed health 8.

Measuring Tool 9:

The Measuring Tool 9 is typically built into the Mobile Application 21 but alternatively can be used as a stand-alone tool.

Figure 5:
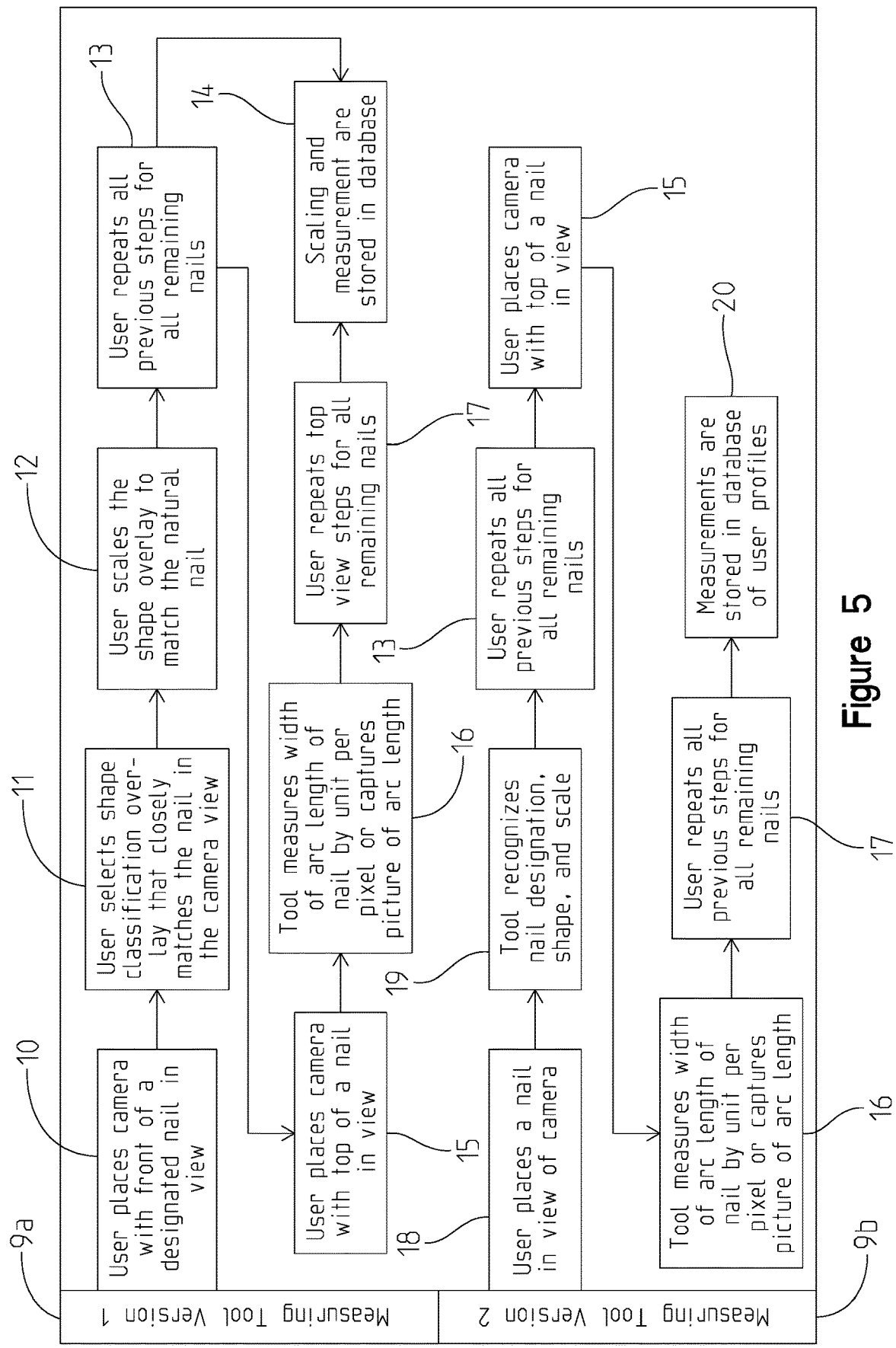
FIG. 5 is a schematic flow chart showing two different versions of a measuring tool method.

FIG. 5 depicts a flow chart showing how the Measuring Tool 9 would operate showing two alternative versions 9a and 9b. In a first version shown as Measuring Tool 9a, the user first places a camera with front of a single designated nail in view (10). The camera would typically be part of the users' mobile device (i.e. smartphone, tablet etc.). The user then selects a desired shape classification overlay which most closely matches the nail in the camera view, (11). Shape classifications of natural nails or cuticle shapes will be derived from standard available cuticle shapes and from accumulated data derived from the Mobile Application 21 stored in a database of shape classifications. The user then can scale the shape classification overlay to match the natural nail, (12). The above steps are repeated for all the remaining nails, (13). All the scaling and measurements are stored either locally or in a centralized database, (14). Alternatively, following (13), the user can place the camera with top of a nail in view (15) where the Measuring Tool 9 measures the width of the arc length of the nail by unit per pixel or captures picture of with arc in view, (16). The user then repeats the top view steps for all remaining nails, (17). As above, all the scaling and measurements are stored either locally or in a centralized database. (14).

FIG. 5 also depicts an alternate embodiment for the use of the Measuring Tool 9b. In this embodiment, the user begins by placing a nail in view of camera. (18) The Measuring Tool 9b recognizes the nail designation, shape, and scale. (19) The user then places the camera with top of a nail in view, (15). The Measuring Tool 9b then measures the width of arc the length of each nail by unit per pixel. In one non-exclusive embodiment, the Measuring Tool 9b may also capture a picture of arc length. (16) The user then repeats all previous steps for all the remaining nails, (13). Similarly, the user then repeats the top view steps for all remaining nails, (17). All the measurements are stored in database of user profiles either locally or in a centralized database, (20)

Figure 6:
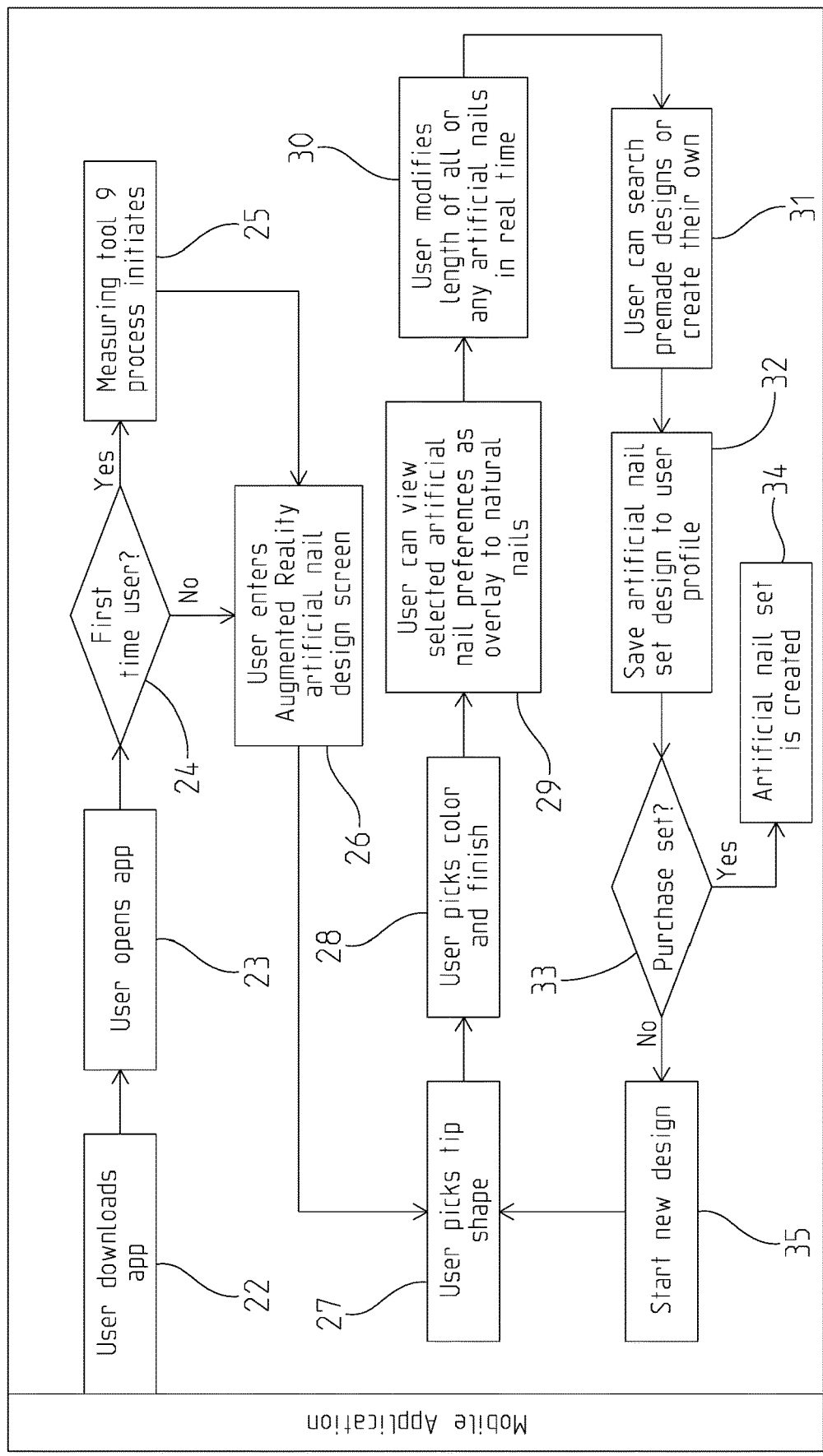
FIG. 6 is a flow chart depicting the use of a mobile application.

Mobile Application 21:

FIG. 6 depicts a flow chart showing the typical user interface in the form of the Mobile Application 21 the user will utilize to measure and order their artificial nails. The process begins when the user downloads (22) and opens (23) the Mobile Application 21. The user is first asked if they are a first time user (24). If "Yes", the user is taken to the Measuring Tool 9 to begin that process. If the user is not a first time user, the user enters an Augmented Reality view or screen, (26). The Augmented Reality view is similar to the user's camera view, but with a computer-generated image of a user's view of the real world, superimposed with nail-like objects on a simulation of a user's finger 7, thus providing a composite view of the user's expected manicure.

Users then pick a nail tip shape (27), color and finish (28). The nail tip is the extension of the artificial nail that goes beyond the distal edge of the nail plate from a zero point where there is no extension to natural nail plate to a higher length of their choosing. Nail tip shapes can include, but are not limited to, rounded, oval, stiletto, flare, square, edge, lipstick, mountain peak, ballerina, squoval, almond, and arrowhead. The nail tip shape can also be any unique design created by the user if design specifications are met. Nail tip shapes can also be selected and interchanged on each nail.

Color choices can be any color in a color palette and for example can range from any available color or combination thereof, for example, red, orange, yellow, green, blue, indigo, purple and their respective shades, hues, saturations, and other. Finish or textures can be selected and can include velvet, metal, marble, glitter, and plastic, a rough or raised finish, glossy or matte. As part of the finish selection process, any pattern or images could be selected or uploaded (such as stripes, dots, stars, etc.) and overlaid onto the artificial nails.

The user can view the selected artificial nail preferences as an overlay to their natural nail bed 8 (29). The user can modify the length of all or any of the artificial nails in real time. (30). The user can also search from pre-made designs or create their own. (31). The artificial nail set design can be saved to the user's profile. (32). The user is then asked if they want to purchase the set (33) and if yes, the Artificial Nail Set 50 is created (34). If not, then a new design can be started (35).

The Mobile Application 21 contemplates that users log into the application or sign up for an account using their email and a user-designated password. The Mobile Application 21 will store their initial measurements from the Measuring Tool 9 process and the user will be able to update said measurements at any time while using the Mobile Application 21. The Measuring Tool 9 process as describe above then initiates.

The Mobile Application 21 in conjunction with the Measuring Tool 9, measures the curvature of the user's natural nail plate from cross-section view of the fingertip by placing a point on one side of the lateral nail groove and then placing another point on the opposite side lateral nail groove, and the distance between the two points is calculated using parallax imaging, or similar imaging processing. Then a point is placed at the midpoint of this line and above this line on the highest point on the distal edge of the nail plate. The Mobile Application 21 then uses geometric relationships to approximate the user's natural nail plate curvature. Alternatively, other methods of measurement can be used to measure the nail curvature. For example, many points along the curve can be placed to reconstruct the curve for a reading of the user's curvature and translated to a real-world measurement by a "pixels per metric" ratio. The Mobile Application 21, in conjunction with the Measuring Tool 9, will perform curve fitting around the perimeter of each nail and generate measurements to be used in printing each artificial nail. The disclosure contemplates that as an alternative to curve-fitting, image recognition or an artificial intelligence (AI) system can be used to process an image of the user's nail (the visual information) by relying on computer vision, and identifying the nail to categorize the image based on the nail shape.

All measurements are then used to modify and customize the existing models (e.g. CAD) to the user's nail shape. The method can also be replicated on toenails to achieve the same measurements. If the Mobile Application 21 is not used, stand-alone software can complete this process or alternatively, the process can be manually completed with a person using proper images of the user's nails.

The disclosure contemplates that users are able to build individual profiles with desired personal information including for example, name, profile pictures, usernames, biographies, self-made nail designs, nail designs from other users, wish lists, etc. A nail design created by the user in the Mobile Application 21 would typically encompass length, color, texture, pattern or image, and shape specified by the user.

In the Mobile Application 21, users are able to create a nail design for their manicure, as well as view in real-time what the manicure looks like on either one or both of their hand(s) through Augmented Reality view.

The Mobile Application 21 can allow for unique artist designs to be used. For example, the user may submit designs created in or outside the application. In addition, professional artists or general users can submit their work to the application.

Users can request and purchase their custom Artificial Nail Set 50 through the application, which is then 3D-printed and sent to the user's designated shipping address or printed in a store for user to pick up. Alternatively, the user may send the Artificial Nail Set 50 to a local 3-D printer.

It is also contemplated that the Mobile Application 21 can give personalized recommendations for design variables based on skin tone and hand shape. Alternatively, the Mobile Application 21 can suggest designs based on previous history, trends, and other relevant data metrics.

Artificial Nail Set 50:

The Artificial Nail Set 50 is composed of a number of artificial nails with a nail design 47 specified by the user, unique to each nail. After the nails are designed in the Mobile Application 21 and the measurements of the nails are taken with the Measuring Tool 9, the nail design 47 variables (nail curvature, area of the nail, shape, length, color, texture, material, or pattern/image) are sent to a database under the account of the user. From the database the variables are extracted and used to modify an existing CAD or similar 3D modeling software file. The file will depend on the shape, length, or texture selected and the area of the nail and curvature will be modified accordingly.

Each artificial nail is created using a 3D printer by sending the specifications through a software to a 3D printer where the Artificial Nail Set 50 (typically and traditionally 10 nails) can begin printing in the user-specified dimensions. Note that the Artificial Nail Set 50 is not limited to 10 and can be modified to be any number of nails.

Each nail is custom fit to the shape, curvature, width, and length of all the user's natural nail beds 8. The material composition of the nail is water-soluble, with a coating/film/wrap around the nail to protect it from dissolving prematurely. Each artificial nail can be hardened/stiffened with a special coating or enhancement of the material composition if necessary (for example, if the user selects a long length of the nail 4 mm or greater). The nail is customized to the user's dimensions and then personalized by the user. The personalization of the nail includes: a reinforced nail tip 3, shape, length, the color, the design or image overlay, texture and finish.

Figure 7:
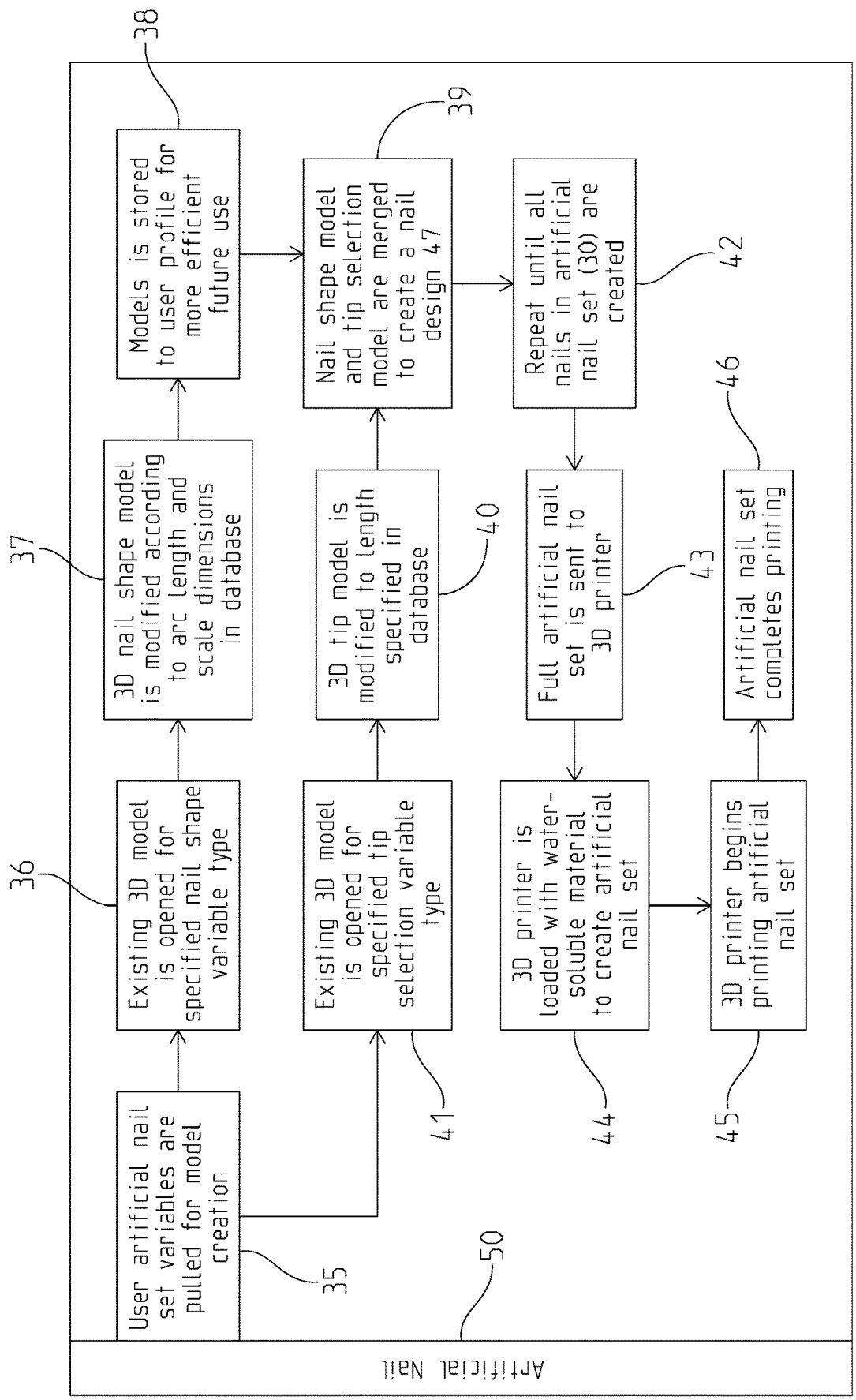
FIG. 7 is a flow chart depicting a method for creating artificial nails.

FIG. 7 depicts a flow chart showing how the Artificial Nail Set 50 can typically be generated. First the Artificial Nail Set 50 variables that were input by the user and saved are pulled for model creation, (35). An existing 3D model is opened for a particular specified nail shape variable type, (36). A 3D nail shape model is modified according to arc length and scale dimensions that are contained in the database, (37). Models for the Artificial Nail Set are stored to the user profile for more efficient future use, (38). Alternatively and/or simultaneously, after the Artificial Nail Set 50 variables that were input by the user and saved are pulled for model creation (35), the existing 3D model is opened for specified tip selection variable type (41) and the 3D tip model is modified according to length specified in the database. (40). The process is repeated until all nails in Artificial Nail Set 50 are created, (42). The nail shape model and tip selection model are then merged (39) to create a user design 47. The full Artificial Nail Set 50 is sent to 3D printer, (43). The 3D printer is loaded or preloaded with water-soluble material to create the Artificial Nail Set 50, (44). The 3D printer begins (45) and then completes printing the Artificial Nail Set 50, (46).

The 3D printing material which forms the artificial nail soluble base 6 includes polymers such as polyvinyl alcohol, butenediol vinyl alcohol co-polymer, a composite of polyvinyl alcohol and other similar materials. Alternatively, the 3D printing material can be a water-soluble thermoplastic made through the polymerization of acrylol morpholine monomers via ultraviolet curing. Typically, each nail in the Artificial Nail Set 50 will have a soluble polymer, up to 100%, to maintain the removal process functionality.

As described herein, each nail of the Artificial Nail Set 50 is printed from measurements gathered by the Measuring Tool 9. Once each nail has completed printing, the nails will be removed from the print bed and post-processed, including but not limited to: cleaning and surface/edge refinement stage with sandpaper, heat, or other chemical processes. At this stage, colors, patterns and/or image overlays can be applied. In addition, the protective insoluble top coating 1 and/or the reinforced nail tip 3 can be applied. The adhesive coating 5 and an adhesive release liner tab 2 are also applied to each nail. The reinforced nail tip 3, especially for nail tips exceeding 0.3 mm extension from the natural nail bed 8, can be covered in an acrylic coating or a similar hardener coating.

Nail Coating:

Multiple layers of coatings may optionally be applied to the underlying soluble polymer to achieve the user's desired effect. For example, the initial coating may be a primer over the artificial nail soluble base 6, with the next coating layer to be the color coating until fully coated, and followed by a top coat with a glossy, semi-glossy, matte sheen, or another type of protective insoluble top coating 1. The coating may be sprayed, dipped, or otherwise layered onto each artificial nail. The coating may be a coating that allows color pigments to be mixed into the user's desired shade. These pigments may include raw color pigments. Additionally, a user-specified design 47 may be added at any time of the coating process. For example, a paper substrate or a label such as a piece of printed paper, plastic, vinyl, or other material with pressure sensitive adhesive on one side can be applied to top of one or more of each nail of the Artificial Nail Set 50. The protective insoluble top coating 1 can then be applied.

The protective insoluble top coating 1 protects the artificial nail soluble base 6 from environmental solvent exposure. To remove each nail, the protective insoluble top coating 1 or other hard coating is abraded or peeled or otherwise compromised to expose the artificial nail soluble base 6, and the user soaks their fingertip in a solvent solution (typically water) until the artificial nail soluble base 6 becomes soft enough to remove without damaging the natural nail bed 8 beneath.

Nail Adhesive:

The adhesive coating 5 is typically pre-applied on the back of each artificial nail to attach the artificial nail to the user's natural nail bed 8. The properties of the adhesive coating 5 to attach the artificial nail to the natural nail bed 8 are as follows: 1) biocompatible, i.e. not harmful to living tissue; 2) will not dry out the natural nail bed 8; 3) will maintain natural keratinization of the natural nail bed 8; and, 4) additional nanoparticles can be added to the adhesive coating 5 such as undecylenic acid, clotrimazole, terbinafine, or mentholated cream to fight nail fungal infection while wearing the Artificial Nail Set 50. In an alternative embodiment, the adhesive coating 5 may be supplied separately with one or two adhesive release liner tabs 2 to allow the user to apply to the nail or their natural nail bed 8 themselves. In yet another embodiment, the Artificial Nail Set 50 is supplied without any adhesive coating 5 to allow the user to utilize any adhesive of their choosing.

The adhesive coating 5 can be from any type of material including but not limited to natural polymers derived from vegetable sources such as dextrins, or starches and the like; protein sources such as casein, blood, fish, soybean, milk albumen and the like; and animal sources such as hides, bones or the like. Water-soluble synthetic polymers may also be used, which can include polyvinyl alcohol, cellulose ethers, methylcellulose, carboxymethylcellulose, and polyvinylpyrroli done and the like. The adhesive may also be a water-soluble hydrogel adhesive.

Finalization and Delivery of the Final Artificial Nail Set 50:

A post-processed nail set will be packaged in a recyclable/reusable box or similar packaging 4. The disclosure contemplates that other materials will be included in the packaging 4 and specifically tools necessary to apply and remove nails. These tools include, but are not limited to: 1) a nail file; 2) tweezers or the like to assists in application of the artificial nail to the natural nail; and 3) a blade or similar tool used to cut/abrade/peel the hard coating of the artificial nail to expose the soluble base for removal.

Other Embodiments

The Mobile Application 21 can be optional. All other steps in the process are applicable, but the Measuring Tool 9 is used by the user. The variables (length, shape, color, texture, material, design) can be gathered verbally, electronically, or through another medium not listed, with the user stating directly what they want without the need for the Mobile Application 21. It is contemplated that the Measuring Tool 9 can be utilized independently with only a mobile device or other camera wherein the Measuring Tool 9 will measure the nails of a user.

Additionally, the adhesive could be a rapid-curing adhesive such as cyanoacrylate, nail glue for artificial tips, the resin used for dip nails or fiberglass wraps, or household super glues. The adhesive can also be a medical grade biocompatible cyanoacrylates.

Other options include but are not limited to: 1) color pigments can be pre-mixed into 3D printing material; 2) the hard coating could be a gel polish or gel coating, which could be UV-cured, catalyst cured, or temperature cured, for example; 3) the artificial nails can be coated with a colored specialty rubber based insulating coating, for example a synthetic rubber or any artificial elastomer that is peelable, flexible, waterproof, non-slip, and insulating; 4) the artificial nails can be coated with a clear UV-curable gel coating that has added raw pigments that create the desired shade of color specified by the user; and, 5) the artificial nails could be made of material that is not soluble, such as metal, wood, precious gemstones, etc.

In some embodiments, a cosmetic nail system 200 for generating artificial nails 801, 802, 803, 804 based on nails of a user may include a user interface 202, a dimensioning device 204, an image capturing device 206. As shown in FIGS. 12 and 13, the cosmetic nail system 200 may be included in a mobile device 240, such as a mobile phone or other computing device. The image capturing device 206 may be embodied as a camera of a mobile phone. The image capturing device 206 is configured to capture at least one image of each nail of the user. The user interface 202 includes a nail receiving portion 208 defined by a plurality of boundaries (e.g., boundaries 210, 212, 214, 216). The nail receiving portion 208 is resizable from a first set of dimensions 218 to a second set of dimensions 220. In some embodiments, the dimensioning device 204 may be referred to as controller a having a memory and a processor configured to execute instructions stored on the memory. The dimensioning device 204 is configured to receive nail data from the user interface 202 and additional data from the image capturing device 206. The nail data includes the second set of dimensions 220 of the nail receiving portion 208.

In some embodiments, the plurality of boundaries include: a first nail length boundary 210, a second nail length boundary 212 parallel to the first nail length boundary 210, a first nail width boundary 214 perpendicular to the first nail length boundary 210 and the second nail length boundary 212, and a second nail width boundary 216 parallel to the first nail width boundary 214. At least one of the nail length boundaries is movable from an initial position (see, e.g., FIG. 12) to a final position (see e.g., FIG. 13). In the illustrative embodiment, the movement of the at least one nail length boundary is limited such that the first and second nail length boundaries 210, 212 remain parallel at all times. In the illustrative embodiment, the second nail length boundary 212 is movable and the first nail length boundary 210 is fixed. In the final position the first nail length boundary 210 is aligned with a free edge or end of a nail of a user. At least one of the nail width boundaries 214, 216 is movable from an initial position (see, e.g., FIG. 12) to a final position (see, e.g., FIG. 13), so long as the first and second nail width boundaries 214, 216 remain parallel. In the final position, the first nail width boundary 214 is aligned with a first sidewall of the nail of the user and the second nail width boundary 216 is aligned with a second sidewall of the nail of the user. In some embodiments, the first and second nail width boundaries 214, 216 only move simultaneously and are configured to remain equidistant from a midpoint there between at all times. The second set of dimensions 220 of the nail receiving portion 208 is defined by the final positions of the at least one movable nail length boundary 210, 212 and the at least one movable nail width boundary 214, 216. The second set of dimensions 220 of the nail of the user may be referred to as the nail size.

In the illustrative embodiment, the user interface 202 includes a first slide bar 222 and a second slide bar 224. In some embodiments, the at least one nail length boundary is configured to move only when the user interface 202 senses sliding contact with the first slide bar 222 (e.g., when a user slides a finger along the first slide bar 222). Similarly, the at least one nail width boundary is configured to move only when the user interface 202 senses sliding contact with the second slide bar 224. In some embodiments, the user interface 202 is configured to display a plurality of nail receiving portions 208, with never more than one nail receiving portion 208 being displayed at any given time. Each nail receiving portion 208 is associated with a different nail of the user. The user interface 202 includes ten identifiers (e.g., 805)—each one associated with a different nail of the user. The user interface 202 is configured to display one of ten total nail receiving portions 208 when the user interface 202 senses that the corresponding identifier is touched by the user. The user interface 202 sends the nail size (i.e. second set of dimensions 220) to the dimensioning device 204 along with a signal identifying the nail with which that nail size is associated.

The image capturing device 206 is configured to capture: (i) a first image of each nail showing a cuticle shape of the nail, and (ii) a second image of each nail showing a curvature of the nail. The first image is a top-down view of the nail, and the second image is a front view of the free edge of the nail. The cuticle shape has its ordinary meaning, referring to the shape of the cuticle of the user. The curvature of the nail refers to the convex curve of the nail from the first side wall to the second side wall of the nail. The image capturing device 206 is configured to send nail shape data including the cuticle shape and the curvature of the nail to the dimensioning device 204. Based on the nail size data and the nail shape data received from the user interface 202, the dimensioning device 204 is configured to determine an artificial nail profile. The dimension device 204 is configured to send the artificial nail profile to a printing device, which is configured to print artificial nails each having the respective artificial nail profiles determined by the dimensioning device 204.

In some embodiments, the user interface 202 is configured to display a plurality of design characteristics of the artificial nail (e.g., 801, 802, 803, 804), which are selectable by a user. The design characteristics include at least one of: tip shape of a free edge of the artificial nail, length of the artificial nail, two-dimensional pattern on a top surface of the artificial nail, and a three-dimensional pattern of the artificial nail. In some embodiments, all the design characteristics are selectable by the user with various option of each design characteristics being displayed on the user interface 202. In other embodiments, at least one, but not all of the above-mentioned design characteristics are selectable by the user. In any event, the dimensioning device 204 is configured to receive selected design characteristics from the user interface 202. In some embodiments, the cosmetic nail system includes a printing device, which may be of the type known in the art, and the printing device is configured to print artificial nails (e.g. 801, 802, 803, 804) each having the nail size and selected design characteristics received by the dimensioning device 204.

In some embodiments, the user interface 202 displays a plurality of selectable three-dimensional patterns, and each of the three-dimensional patterns have a plurality of openings formed in the artificial nail. As shown in FIGS. 8-11, respectively, the three dimension patterns may include a net pattern 801, a honeycomb pattern 802, a waves pattern 803, and a fishnet pattern 804. Three dimensional patterns such as the net pattern 801, honeycomb pattern 802, fishnet pattern 804 have a plurality of commonly shaped openings. For example, the net pattern 801 includes square openings and the honeycomb pattern includes circular openings, each of which may be referred to as geometric shapes. The openings may also be non-geometric shapes. For example, the waves pattern 803 includes a plurality of non-geometric shapes such as elongated curved openings and the fishnet pattern 804 includes a plurality of repeating geometric shapes, which in this embodiment, are squares with rounded corners. Each of the three dimensional patterns of FIGS. 8-11 includes a solid border 806 surrounding the plurality of openings. At least the fishnet pattern 804, and in some embodiments, the net pattern 801 and the honeycomb pattern 802, includes a greater area of openings than area of artificial nail material. The fishnet 804 includes at least four times more area of openings than area of artificial nail material.

The invention claimed is:

1. A method of generating artificial nails comprising:
capturing with an image capturing device a first image of each nail of a user from a top-down view of the nail, the first image including the cuticle shape of the nail;
capturing with the image capturing device a second image of each nail from a front view of a free end of the nail, the second image including the curvature of the nail;
determining with a dimensioning device a nail profile of artificial nails based on a length of each nail, a width of each nail, the cuticle shape of each nail, and the curvature of each nail;
printing with a printing device artificial nails each having the nail profile determined by the dimensioning device; and
receiving with the dimensioning device a set of dimensions including the length of each nail and the width of each nail based on final positions of a plurality of movable boundaries of a nail receiving portion of a user interface.

2. The method of claim 1, further comprising:
displaying with a user interface a plurality of selectable design characteristics of the artificial nails including:
tip shape of the free end of the artificial nail,
length of the artificial nail,
two-dimensional pattern on a top surface of the artificial nail, and
three-dimensional pattern of the artificial nail; and
determining, with the dimensioning device, the selected design characteristics of the artificial nails.

3. The method of claim 2, wherein printing artificial nails further includes:
printing artificial nails each having a nail profile and the design characteristics determined by the dimensioning device.

4. The method of claim 3, wherein the selectable design characteristics include at least one three-dimensional pattern having a plurality of openings formed in the artificial nail.

5. The method of claim 4, wherein the plurality of openings are arranged to form at least one of:
a fish net pattern,
a honeycomb pattern,
a net pattern, and
a waves pattern.

6. The method of claim 1, further comprising:
displaying movement, by a first boundary of the plurality of boundaries, from an initial position to a final position, wherein in the final position the first boundary is aligned with a free edge of a nail of a user; and
displaying movement, by a second boundary of the plurality of boundaries, from an initial position to a final position, wherein in the final position the second boundary is aligned with a first sidewall of the nail of the user.

7. The method of claim 6, further comprising:
displaying movement, by a third boundary of the plurality of boundaries, from an initial position to a final position, wherein in the final position the third boundary is aligned with a second sidewall of the nail of the user opposite the first sidewall;
wherein displaying movement of the third boundary is performed simultaneously with displaying movement of the second boundary.

8. The method of claim 1, wherein the user interface is a touch screen; and
wherein each displaying step is triggered by recognition of sliding motion along the user interface.

9. The method of claim 1, wherein printing artificial nails includes printing a water soluble material to form the artificial nails.

10. A cosmetic nail system for generating artificial nails, the cosmetic nail system comprising:
an image capturing device configured to capture: (i) a first image of each nail showing a cuticle shape of the nail, and (ii) a second image of each nail showing a curvature of the nail;
a dimensioning device configured to determine nail profiles of artificial nails based on length of each nail, width of each nail, the cuticle shape of each nail, and the curvature of each nail;
a printing device configured to print artificial nails each having the nail profiles determined by the dimensioning device,
a user interface configured to display a plurality of design characteristics of the artificial nail, which are selectable by a user, the design characteristics including at least one of:
tip shape of a free edge of the artificial nail,
length of the artificial nail,
two-dimensional pattern on a top surface of the artificial nail, and
three-dimensional pattern of the artificial nail;
wherein the dimensioning device is configured to receive selected design characteristics from the user interface;
wherein the printing device is configured to print artificial nails each having the nail profiles and selected design characteristics received by the dimensioning device; and
wherein at least one three-dimensional pattern of the artificial nail includes a plurality of openings formed in the artificial nail.

11. The cosmetic nail system of claim 10, wherein the plurality of openings are arranged to form at least one of:
a fish net pattern,
a honeycomb pattern,
a spider web pattern, and
a waves pattern.

12. The cosmetic nail system of claim 10, wherein the user interface is configured to measure the length and the width of each nail.

13. The cosmetic nail system of claim 12, wherein the user interface includes a nail receiving portion defined by a plurality of boundaries;
wherein the nail receiving portion is resizable from a first set of dimensions to a second set of dimensions through movement of at least one boundary of the plurality of boundaries;
wherein the second set of dimensions includes the length of each nail and width of each nail; and
wherein the user interface is configured to send the second set of dimensions to the dimensioning device.

14. The cosmetic nail system of claim 13, wherein the plurality of boundaries include:
a first nail length boundary;
a second nail length boundary parallel to the first nail length boundary;
a first nail width boundary perpendicular to the first nail length boundary; and
a second nail width boundary parallel to the first nail width boundary;
wherein at least one of the nail length boundaries is movable from an initial position to a final position, so long as the first and second nail length boundaries remain parallel;
wherein at least one of the nail width boundaries is movable from an initial position to a final position, so long as the first and second nail width boundaries remain parallel; and
wherein the second set of dimensions of the nail receiving portion is defined by the final positions of the at least one movable nail length boundary and the at least one movable nail width boundary.

15. The cosmetic nail system of claim 14, wherein the user interface includes a first slide bar and a second slide bar;
wherein the at least one of the nail length boundaries is configured to move only when the user interface senses sliding contact with the first slide bar; and
wherein the at least one of the nail width boundaries is configured to move only when the user interface senses sliding contact with the second slide bar.

16. The cosmetic nail system of claim 13, wherein the user interface is configured to display a plurality of nail receiving portions, with never more than one nail receiving portion being displayed at any given time;
wherein each nail receiving portion is associated with a different nail of the user.

17. A cosmetic nail system for generating artificial nails based on nails of a user, the cosmetic nail system comprising:
an image capturing device configured to capture at least one image of each nail of a user;
a user interface including a nail receiving portion defined by a plurality of boundaries, the nail receiving portion being resizable from a first set of dimensions to a second set of dimensions;
a dimensioning device configured to receive nail data from the user interface and additional data from the image capturing device, the nail data including the second set of dimensions of the nail receiving portion;
wherein the plurality of boundaries include:
a first nail length boundary;
a second nail length boundary parallel to the first nail length boundary;
a first nail width boundary perpendicular to the first nail length boundary; and
a second nail width boundary parallel to the first nail width boundary;
wherein at least one of the nail length boundaries is movable from an initial position to a final position, so long as the first and second nail length boundaries remain parallel;
wherein at least one of the nail width boundaries is movable from an initial position to a final position, so long as the first and second nail width boundaries remain parallel;
wherein the second set of dimensions of the nail receiving portion is defined by the final positions of the at least one movable nail length boundary and the at least one movable nail width boundary.

* * * * *